United States Patent Office 3,280,683
Patented Oct. 25, 1966

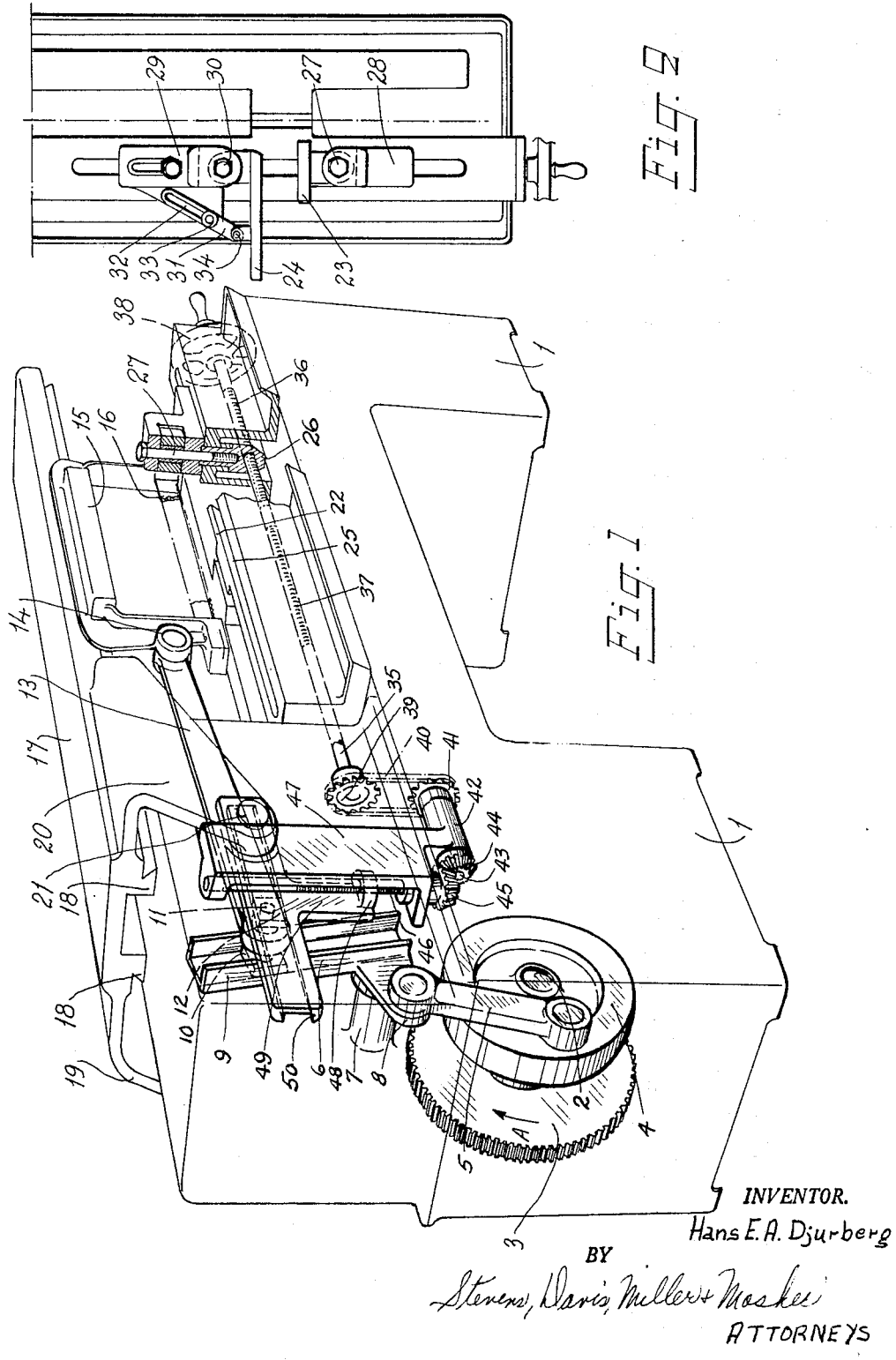

3,280,683
APPARATUS FOR CONTROLLING THE STROKE LENGTH OF TOOLS IN RELATION TO WORK PIECES OF DIFFERENT DIMENSIONS
Hans Evert Alrik Djurberg, Nybodagatan 6B, Solna, Sweden
Filed Aug. 3, 1964, Ser. No. 386,983
Claims priority, application Sweden, Aug. 8, 1963, 8,691/63
7 Claims. (Cl. 83—454)

The present invention relates to a method of controlling the stroke length of tools in relation to work pieces of different processing dimensions in processing machines of reciprocating type.

In processing machines of reciprocating type e.g. shaping machines, sawing machines and the like, the stroke length is adjusted individually for work pieces of different dimensions.

Owing to the difficulty of adjusting the stroke length in such machines, work is normally carried out with the same stroke length all the time. The stroke length is therewith adjusted to the largest work piece to be processed and therefore remains the same during subsequent work processes even though the dimensions of the work pieces vary considerably. This, however, has as a consequence that the tools, especially in the case of saw blades, are often subject to local wear while other parts of the blade are left substantially unworn. In this way, expensive processing tools which are not optimally utilized must often be discarded and exchanged, making production costs substantially higher.

The purpose of the invention is to provide a method whereby the stroke length can be adapted, preferably automatically, to the dimensions of different work pieces.

In accordance with this the invention is characterized in that the processing dimensions of the work piece are scanned and the scanning movement is utilized to adjust the stroke length to individual predetermined values for different processing dimensions.

According to a specially preferred embodiment of the invention, the adjustment movement of a pair of jaws cooperating to securely retain the work pieces is coordinated with the adjustment movement of a varying stroke length means in such a way that a predetermined stroke length of the tool corresponds to each distance between the jaws.

The invention also relates to a means for carrying out the above method, which means is substantially characterized by two jaws mutually movable towards and away from each other for retaining the work pieces between them and a mechanism for controlling the stroke length of the tool, a means being connected between the jaws and the control mechanism to ensure that each relative adjustment position between the jaws always corresponds to a predetermined stroke length of the tool.

The invention will be explained below with reference to an embodiment diagrammatically illustrated in the enclosed drawing.

FIG. 1. shows in perspective, merely as an example of the invention, a sawing machine provided with means for automatically varying the stroke length of the saw blade in relation to different work pieces.

FIG. 2 shows a part of a table on which the work pieces are placed in the sawing machine and jaws provided thereon for securely retaining them.

Reference numeral 1 is used to designate a stand, suitably made of cast steel. A drive shaft 2 is mounted in the stand 1 in a suitable manner not really shown, the drive shaft 2 being driven by a motor, not shown, which by means of a gear, drives the gear wheel 3 which is mounted on the drive shaft. The drive shaft 2 is further provided with a fly wheel 4 which, by means of a connecting rod 5, actuates a rocker arm 6 to oscillating movements around a pivotal axis 7. The rocker arm 6 presents an arm 8 to which the connecting rod 5 is pivotally attached, and a further arm 9. This latter arm has the shape of a guide with an open U-profile. The U-profile shown is in no way limiting for the invention as there are, within the scope of the invention, other guides which could be used for the purpose which will now be explained. In the longitudinal direction of the part 9, a so called die is slidably controlled, which die is prevented from leaving the guide in a suitable way.

A pivot designated by the reference numeral 11 is fixed in the die 10 and attached by its forward end shown in the drawing to a further die 12. The pin 11 can either be pivotally mounted in the die 10 or in the die 11 or possibly in both. Between the dies, the pivot 11 carries one end of a drive rod or link arm 13 which, by means of a hinge 14, is connected to the saw yoke 15 of the sawing machine, the lower part of the yoke carrying a saw blade 16 in conventional manner.

The saw yoke is also displaceably mounted in a conventional manner by means of a slide not shown, along an arm 17 presenting dovetail-shaped guides 18 at its lower part, in which guides the above-mentioned slide is intended to slide forward and back.

The shape of the guide for the slide which is shown is not essential but can be varied in desired manner according to the demands of the construction. The arm 17 is further provided with two arms 19 and 20 projecting downwards, arranged around pivots 21, of which only one is shown, to pivotally mount the arm 17 on the stand 1.

The reference numeral 22 is used to designate the work table of the sawing machine, in the longitudinal direction of which holders 28 and 29 for jaws 23 and 24 are displaceably arranged, the jaws being shown from above in FIGURE 2, the jaw 24 being removed in FIG. 1 in order to show the construction. The table 22, as can be seen from FIGURE 1, is provided with a guide groove 25 in which run nuts 26 which are connected to holders 28 and 29 for the jaws 23 and 24. According to the invention, the jaws 23 and 24 can be pivoted and adjusted in the desired angular position in the plane. Bolts 27 are provided for this purpose. The jaws 23 and 24 are each attached to a holder 28, 29 respectively. As can be seen from FIGURE 2, the jaw 23 is pivotal in relation to the bolt 27 and jaw in relation to bolt 30, which latter jaw is fixable by means of an adjustment arm 31 provided with a guide groove 32 through which a fixer bolt 33 projects. The arm 31 is hinged to jaw 24 at the mounting point 34. The jaw 23 is, on the other hand, normally freely pivotal around the bolt 27 and automatically adapts itself to the work piece. In the table, there runs a lead screw 35 which is provided with a left hand thread 36 and a right hand thread 37, the left hand thread 36 being intended to pass through the nut 26 which is coordinated with the holder 28 of the jaw 23. The right hand thread 37 is intended to cooperate with a similar nut 26 (not shown) which is coordinated with the holder 29 of jaw 24. This lead screw or spindle 35 is provided at its end with a guide wheel 38, by turning which, the jaws 23 and 24 can be caused to approach and retreat from each other. By means of this arrangement the work pieces can be clamped between the jaws and fixed in position.

According to the invention, however, this individual adjustment movement of the jaws in relation to different work pieces is utilized to actuate and automatically adjust the stroke length of the processing tool, preferably automatically. For this purpose, the end of the lead screw 35 is provided with a chain wheel 39 which, via a chain 40, drives a further chain wheel 41 which is mounted in a bracket 42 through which projects a shaft 43. At the other end of the bracket, a conical gear wheel 44 is fixed to this shaft, which gear wheel engages a conical gear wheel 45 fixed to a screw spindle 46. This screw spindle is in turn mounted in a main bracket 47. The screw spindle 46 is latched against movement in the end directions and passes through a nut member 48 which projects from a T-shaped piece 49 which, in a manner not shown in detail, is guided in the main bracket 47. The upper part of the T-shaped piece 49 is provided with a longitudinal guide groove 50 in which the die 12 previously mentioned is displaceably mounted.

The arrangement illustrated operates in the following manner. When the drive wheel 3 and the fly wheel 4 start to rotate in the direction of the arrow A, the rotation movement is converted into a pivotal movement for the guide 9 of the rocker arm, whereby the drive rod 13, via the die and the pivot 11, actuates the saw yoke 15 into a reciprocating movement running on the guide 18 in the arm 17. It is possible for the die 10 to move along the guide 9 during its pivotal movement and likewise the die 12 can run freely in the guide groove 50 in the T-piece 49, so that it is impossible for jamming to occur.

As can be seen from the arrangement shown, the stroke length is dependent on the position of the die 10 in the guide 9 in relation to the pivotal shaft 7 and according to the invention it is now intended to make possible an automatic adjustment of the die 10 in this guide 9 depending on the processing dimensions of the work pieces. Thus, when by means of the guide wheel 38, both the jaws 23 and 24 are actuated so that the work piece is securely wedged between them, the adjustment movement is transmitted from the lead screw 35 via the chain wheel 39, the chain 40, the chain wheel 41, the conical gear wheel 43, the conical gear wheel 45 and the screw spindle 46, to the nut member 48, so that the T-piece 49 is moved along the screw spindle 45 corresponding to the rotation of the lead screw 35. The T-piece in the embodiment shown contributes therewith to vertical adjustment of the die 12, as a result of which the die 10 is adjusted in a corresponding manner in the guide 9. It is intended therewith that the gear ratios should be chosen in such a way that the machine will be able to be adjusted automatically within a certain stroke-length range with individual adjustment to different varying processing dimensions of the work pieces placed between the jaws, which thus means that each such dimension will automatically have a corresponding determined relative position of the die 10 in the guide 9 in relation to its pivotal axis 7. As a special explanation, it can be mentioned that during pivoting of the guide 9, the die 10 moves forward and back around an intermediate position and simultaneously therewith the die 12 runs at a determined level in a linear path in the groove 50 in the angle piece 49. The drive rod 13 is therewith subjected to oscillating movements, the amplitudes of which are dependent on the level of the die 12, i.e. to which level the T-piece 49 has been placed in relation to the pivotal axis 7.

Although a mechanical means for converting the relative movements of the jaws into an adjustment movement for the pivot 11 of the drive rod 13 has been described, the means shown can, according to the invention, possibly be replaced by any other suitable means which effects the same result. Therewith, electrical, hydraulic or pneumatic means can be utilized, which should then be in determined dependence on the relative adjustment movement of the jaws.

The invention is not limited to the embodiment shown and described but can be modified and altered within the spirit and scope of the following claims.

What is claimed is:

1. An apparatus for controlling the stroke length of a tool, said apparatus comprising a rocker arm extending at an angle to the direction of tool movement, drive means to reciprocally pivot said arm, connecting means operatively connecting said arm with said tool to reciprocally drive said tool in response to arm movements, first guide means for guiding said connecting means for first free movement in the longitudinal direction of said arm, work piece scanning means for ascertaining the working length of said work piece, second guide means for guiding said connecting means for second free movement at an angle with respect to said first free movement, control means operatively connected to said second guide means and responsive to said scanning means to move said connecting means along said arm to vary the effective length thereof.

2. The apparatus of claim 1 wherein said work piece scanning means comprises a pair of clamping jaws for engaging said work piece and means to regulate the distance between said jaws in response to the working length of the work piece.

3. The apparatus of claim 1 wherein said second free movement is in substantially the same direction as the direction of tool movement.

4. The apparatus of claim 1 wherein said guide means are rectilinear.

5. The apparatus of claim 1 wherein said connecting means comprises a connecting rod one end of which is connected to said tool, and a pivot head connected to the other end of said rod and guided by said first and second guide means.

6. The apparatus of claim 5 wherein said pivot head is movable in a direction away from the pivot point of said arm in response to an increase in work piece working length, and towards said pivot point in response to a decrease in work piece working length.

7. The apparatus of claim 1 where said first guide means is fixed on said arm and said second guide means is reciprocally movable in response to variations in the working length of the work piece.

References Cited by the Examiner
UNITED STATES PATENTS

| | | | |
|---|---|---|---|
| 1,138,927 | 5/1915 | Berry | 83—647 X |
| 1,522,777 | 1/1925 | Green | 83—647 X |
| 1,665,090 | 4/1928 | Gommel | 83—647 X |
| 1,962,588 | 6/1934 | Gommel | 83—647 X |
| 2,244,029 | 6/1941 | Strayer et al. | 83—647 X |
| 2,278,757 | 5/1942 | Zimmermann | 90—39 |

WILLIAM W. DYER, Jr., *Primary Examiner.*

L. B. TAYLOR, *Assistant Examiner.*